United States Patent [19]

Momose et al.

[11] Patent Number: 5,054,940
[45] Date of Patent: Oct. 8, 1991

[54] CERAMIC BEARING

[75] Inventors: Terunobu Momose; Tetsuo Shibata, both of Gifu, Japan

[73] Assignee: Wing Highcera Co., Ltd., Japan

[21] Appl. No.: 662,379

[22] Filed: Feb. 26, 1991

Related U.S. Application Data

[63] Continuation of Ser. No. 456,311, Dec. 26, 1989, abandoned.

[30] Foreign Application Priority Data

Dec. 26, 1988 [JP] Japan .................. 63-325933
Dec. 26, 1988 [JP] Japan .................. 63-325934

[51] Int. Cl.$^5$ ............................................. F16C 17/10
[52] U.S. Cl. ................................. 384/193; 384/192; 384/907.1
[58] Field of Search ................. 384/193, 192, 907.1, 384/206, 907, 213, 214, 108, 109

[56] References Cited

U.S. PATENT DOCUMENTS

| | | | |
|---|---|---|---|
| 3,641,990 | 2/1972 | Kinnersly | 384/907 |
| 4,634,300 | 1/1987 | Takebayashi et al. | 384/907 |
| 4,767,901 | 8/1988 | Goyarts | 384/206 |

*Primary Examiner*—Lenard A. Footland
*Attorney, Agent, or Firm*—Eckert Seamans Cherin & Mellott

[57] ABSTRACT

A ceramic bearing comprising a ceramic-made outer ring provided with a non spherical curved inner slide face, and a ceramic-made inner ring provided with an outer slide face so curved as to match with the curved inner slide face formed in the inner circumference of the ceramic outer ring and a shaft hole through which a shaft extends, which shaft extending or passing at the axis of the slide face of the ceramic inner ring coincidently.

6 Claims, 2 Drawing Sheets

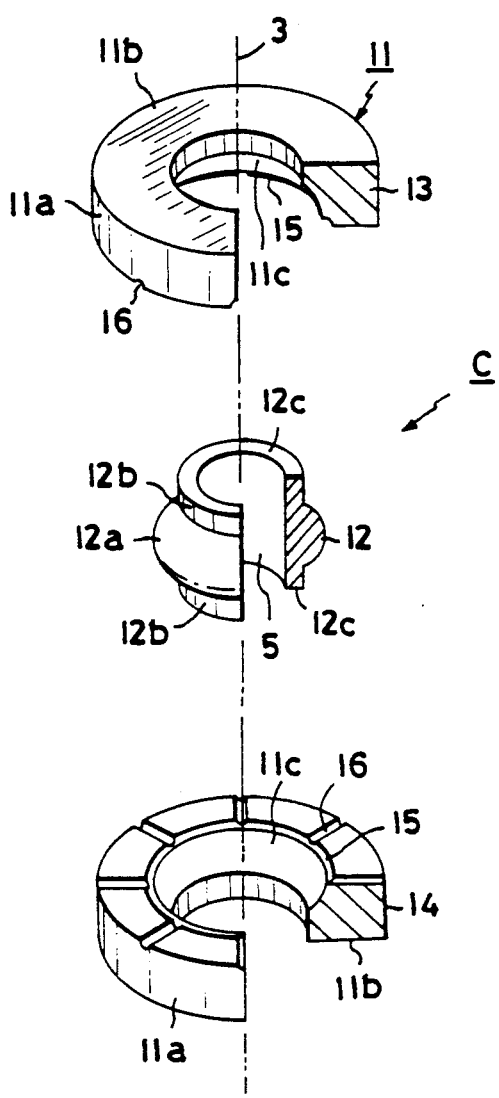
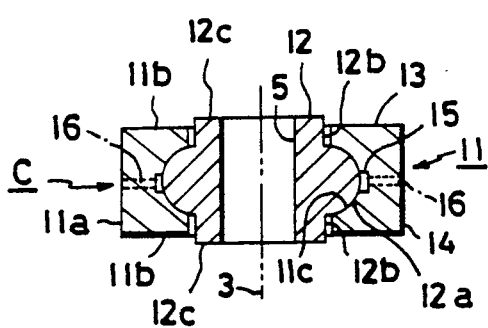
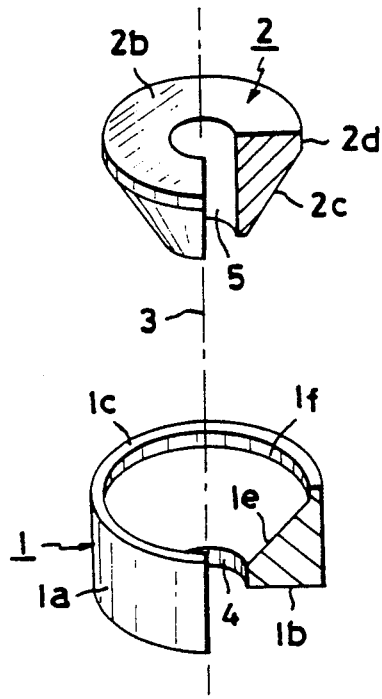

CERAMIC BEARING

This is a continuation of application Ser. No. 456,311, filed Dec. 26, 1989, now abandoned.

FIELD OF THE INVENTION

The present invention relates to a ceramics-made bearing and a manufacturing method thereof, which bearing being constructed by combining a ceramic inner ring and a ceramic outer ring.

DESCRIPTION OF THE PRIOR ART

Nowadays, various bearings, such as slide bearings or roller bearings have been used or employed widely when rotary shafts are installed in machine frames.

It is apparent that the roller bearings have respectively an outer ring to be fitted into a housing formed in the machine frame, an inner ring through which a rotary shaft extending, and roller members, such as balls, rollers, and needles situated and arranged between the outer ring and the inner ring. According to the kind of the roller members, they are called a ball bearing, a roller bearing, a needle bearing. According to the manner of receiving load, they are called a radial bearing, a thrust bearing, and etc. (see Japan Patent Publication Sho. 49-41231).

Of these kinds of bearings, the particular bearings such as a deep-groove type ball bearing, an angular type ball bearing, and a taper roller bearing, and etc are used as the bearing enabling to support the shaft to which a radial load and a thrust load are simultaneously applied.

Some roller bearings are made or constructed of a metal supporter made of steel, cast iron, copper and the like and a white metal layer laminated on the metal supporter, which metal layer is machined to the predetermined size using a machine tool, and other roller bearings are made of another metal supporter made of copper, bronze metal, and the like and an oil-contained alloy metal layer laminated on the metal supporter or buried in the metal supporter.

The roller bearing provided with a sleeve-like metal supporter has been used as a bearing for supporting a radial load (see Japan Patent Publication Sho. 49-18885). In addition, the roller bearing having a metal supporter shaped in a disc is used that one for supporting a thrust load (see Japan Patent Publication Sho. 49-678).

Many roller bearings and roller bearings mentioned above are standardized and widely sold on market and the various bearings mentioned above respectively have particular characteristics. On designing a machine, these bearings are selected and employed after considering the characteristics of them.

The conventional roller bearings and slide bearings have their shortcomings.

Flaking phenomenon due to rolling fatigue is happened on the roller bearings after a long period of usage necessarily shortens their lives and lowers thermal resistance. Furthermore, because the number of constructing parts of the conventional roller bearings is high, the cost of the product becomes high. When the rolling member is worn, rattling noise is disadvantageously generated.

When the conventional roller bearing supports the shaft on which a thrust load and a radial load are simultaneously applied, a bearing system consisting of a sleeve-like radial bearing and a disc-like sleeve bearing is used or a paricular or custom-made bearing is used on the occasion. It has been disadvantage that because sliding faces of the shaft and the pertinent bearing slidingly contact to each other, usage for a long period causes the bearings and shaft worn away.

SUMMARY OF THE INVENTION

It is the main purpose of the present invention to provide a ceramic-made sliding bearing enabling to support a shaft to which a thrust load and a radial load are simultaneously applied, which sliding bearing being constructed by contacting in slide the ceramic inner ring to the ceramic outer ring and making the contacting faces of these rings of curved faces.

It is another purpose to provide a bearing with few parts constructing the bearing, which bearing having its inner ring and outer ring, respectively made of ceramics.

In consequence, the ceramic bearing manufactured according to the present invention, in order to attain the purposes above, consists of a ceramic-made outer ring provided with a curved inner slide face, and a ceramic-made inner ring provided with an outer slide face so curved as to match with the curved inner slide face formed in the inner circumference of the ceramic outer ring and a shaft hole through which a shaft extends, which shaft extending or passing at the axis of the slide face of the ceramic inner ring coincidently.

According to another embodiment of the ceramic-made bearing of the present invention, it consists of a ceramic-made outer ring provided with a curved inner slide face, and a ceramic-made inner ring provided with an outer slide face so curved as to fit to the curved inner slide face formed in the inner circumference of the ceramic outer ring and a shaft hole through which a shaft extends, which shaft extending coincidentally through the axis of the slide face of the ceramic inner ring, wherein the ceramic inner ring being contained in the ceramic outer ring.

Combining the ceramic outer ring (referred to hereinafter as an outer ring) provided with a curved slide face at its inner circumference and the ceramic inner ring (referred to as an inner ring hereafter) having a slide face so curved as to fit to the slide face of the outer ring and a shaft hole through which a shaft fits as described above enables to provide or construct a slide bearing having sliding faces respectively formed on the outer ring and the inner ring.

According to the present invention, the slide bearing is constructed by containing the inner ring in the divided outer ring, so that the inner ring doesn't move axially.

In the ceramic bearing of the present invention, because that these slide faces of the outer ring and the inner ring are made of curved shape, it is possible to support a radial load and/or a thrust load when a shaft fits to or extends through the shaft hole formed in the inner ring and both the radial load and the thrust load simultaneously or one of them singly is applied to the shaft. That is, when the bearing supports a shaft to which only a radial load is applied, the radial load can be supported through slide faces formed in parallel with the axis of the shaft. On the contrary, when the bearing supports a shaft to which only a thrust load is applied, the radial load can be supported through slide faces so formed perpendicular to the axis of the shaft. Further, when the bearing supports the shaft to which a radial load and a thrust load are simultaneously applied, the loads can be supported through slide faces so formed as to extend along a compound direction of application of these load.

Because the bearing is constructed with an outer ring and an inner ring, the number of constructing parts of the bearing can be downed lowered than that of the conventional roller bearings, lessening the manufacturing cost.

A sliding contact happens between the inner circumference of the outer ring and the outer circumference of the inner ring of the bearing, so that no sliding action is generated between the shaft and the inner ring. Accordingly, even after usage of a long time, there is no risk or danger of a generation of wear on the shaft.

Due to the fact of manufacturing the outer ring and the inner ring of ceramics, the sliding friction-is low and as a result heat generation owing to the friction can be lowered. In addition, thermal expansion is small and stress to be generated in the machine frame and the shaft can be lessen.

In consequence, the manufacturing method of the ceramic bearing according to the present invention comprises the steps, in order to attain the purpose above, of containing the ceramic inner ring in the ceramic outer ring constructed by dividing itself in a plural number of members, of adhering the plural ceramic outer ring members to each other, of injecting abrasive into a gap between the slide face formed on the ceramic outer ring and another slide face of the ceramic inner ring, of rotating relatively the ceramic outer ring and the ceramic inner ring so as to abrade these rings, of injecting fluid into the gap between the slide faces so as to make the abrasive flown out of the gap, and of injecting a lubricant into the gap formed between the slide faces.

According to the ceramic bearing manufacturing method, the inner ring is contained in the outer ring members plurally divided and formed and after that these outer ring members are melted or adhered to be joined, so that it is possible to contain the inner ring in the outer ring in a manner of rotation. Further, abrasive such as diamond powder and the like is injected onto or applied to the slide faces of the inner ring and the outer ring, both these rings are rotated relatively so as to abrade the slide faces, a fluid is injected onto the slide faces of the outer ring and the inner ring in order to discharge the abrasive, and rublicant is injected onto the slide faces, thus it is possible to manufacture a slide bearing provided with an inner ring rotatable smoothly.

BRIEF DESCRIPTION OF THE DRAWING

FIG. 3 is another explanative development of the bearing of the second embodiment according to the present invention.

FIG. 4 is an assembly showing the combined bearing of the second embodiment according to the present invention.

FIG. 5 is a development of the bearing according to another embodiment of the present invention.

DETAILED DESCRIPTION OF THE PREFERRED EMBODIMENTS (The First Embodiment)

Figure 1:
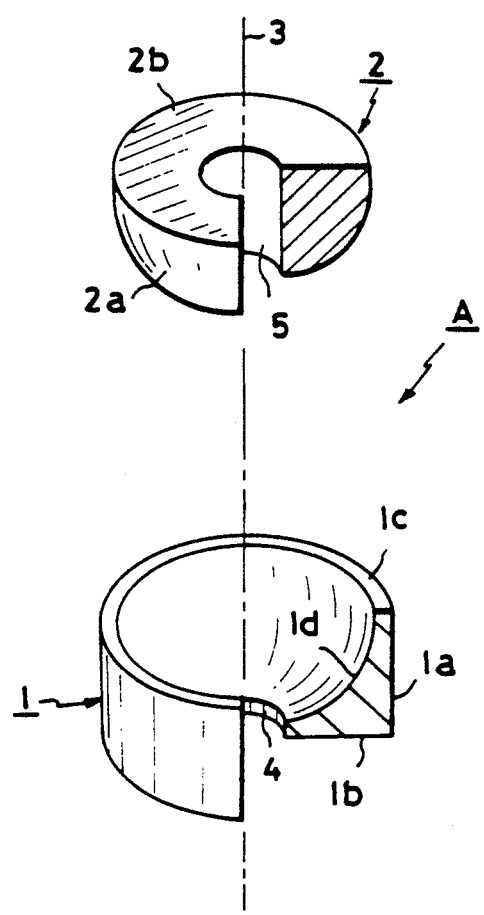
FIG. 1 is an explanative development of the bearing of the first embodiment according to the present invention.
Figure 2:
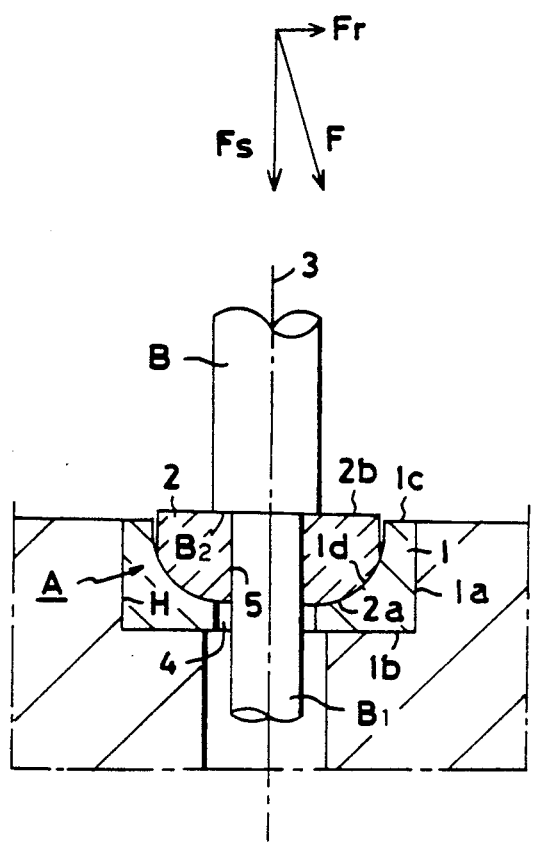
FIG. 2 is a sectional explanation view depicting a usage condition of the bearing according to the first embodiment.

As shown in FIG. 1 and FIG. 2, it is apparent that the bearing A is constructed with an outer ring 1 and an inner ring 2.

The outer ring 1 is manufactured by filling a mold with oxided substance series ceramics raw material, such as PSZ (Partially Stabilized Zirconia) or alumina and the like, pressing the raw material, and burning the compact molded at a temperature of 1500–1600° C.

The outside shape of the outer ring 1 is formed by an outer circumferential portion 1a of a cylindrical shape and end faces 1b, 1c. The outer circumferential portion 1a is used as a sliding face when the outer circumferential portion is fitted in a housing H formed in the machine frame. So that, the outer circumferential portion 1a is formed so as to parallel with an axis 3 of the outer ring 1 and to have an allowance with reference to the outer circumferential portion 1a and the outer ring 1. A through hole 4 through which a shaft B is loosely inserted is formed in an end face 1b.

At an inner circumference of the outer ring 1, a curved face 1d of a sliding face is formed. As will be described, the curved face 1d is adapted to be used as a sliding contact face with another curved face 2a formed in the outer shape portion of an inner ring 2 which will be described. This curved face 1d is a concaved shaped curved face opening at the end face 1c.

It is possible to construct or form the outer shape or profile of the curved face 1d by combining two spherical faces continuously, which spherical faces have their center on the axis 3 and different diameters. It is also possible to form it by combining curved faces generated with secondary curves axing or arounding the axis 3.

The inner ring 2 is manufactured by filling a mold with oxide substance series ceramics raw material, such as PST or alumina and the like, pressing the substance in the mold, and burning the compact pressed at 1500–1600 ° C.

The outline shape or profile of the inner ring 2 is formed by a curved face 2a corresponding to the curved face 1d formed at the inner circumference of the outer ring 1 and an end face 2b to which a thrust load is applied through the shaft B contacting with the end face 2b through an end face $B_2$ of the shaft B. At the center of the inner ring 2, there is a shaft hole 5 which corresponds to or coincides with the axis of the shaft B in order to be receive a journal portion $B_1$ of the shaft B.

The curved face 2a as shown in FIGS. 1 and 2 is formed in an axially symmetrical but non-spherical curve and used as a sliding face on which the curved face 1d formed on the inner circumference of the outer ring 1 slides. In consequence, the curved face 2a is made of a shape of convex and the center of the curved face 2a corresponds with the axis 3.

The end face 2b formed on the inner ring 2 has a right angle face formed at a high precision relative to the direction of the axis 3. The shaft hole 5 has a predetermined allowance relative to the diameter of the journal portion $B_1$ of the shaft B.

The case in which the bearing A manufactured as described above supports the shaft B to which a thrust load and a radial load are simultaneously applied will be described.

As shown in FIG. 2, the outer ring 1 of the bearing A is contained in the housing H formed at the machine frame. The journal portion $B_1$ of the shaft B fits into the shaft hole 5 formed in the inner ring 2. In this situation, the curved face 2a formed on the inner ring 2 and another curved face 1d formed on the outer ring 1 are mutually contacted. To the shaft B, a thrust load Fs and a radial load Fr are effected, which loads make a compound load F.

The thrust load Fs is transmitted to the inner ring 2 through the end face $B_2$ of the shaft B and the radial load Fr is transferred to the inner ring 2 through the journal portion $B_1$. According to the effecting direction of the compound load F, the curved face 2a of the inner ring 2 and the curved face 1d of the outer ring 1 contact to each other and they slide on the other face or opposite face at their contacting position.

At the contacting point between the curved face 2a and the curved face 1a, the compound load F is divided into two forces tangent to the curved faces 2a and 1d and these forces function as a self-aligning force directed along the axis 3 of the inner ring 2. As a result, the shaft B is urged always toward or so as to coincide with the axis 3.

(The Second Embodiment)

The bearing C shown in FIG. 3 and FIG. 4 is constructed by containing the inner ring 12 in the divided members of the outer ring 11 so as to be able to rotate and move along the axis direction.

As shown, the outer ring 11 has two members or halves 13 and 14 formed symmetrically and oppositely, which member's opposite faces being welded or adhered fixedly.

On the inner circumference of the outer ring 11, it is formed of a concaved shape curved face 11c of a sliding face. This curved face 11c slides on the sliding face 12a formed on the inner ring 12 which will be described.

On the outer circumference of the inner ring 12, there are a convex curved face 12a functioned as a sliding face and a set of bosses 12b extending along both axial directions from the convex curved face 12a. At the end faces of the bosses 12b, there are contacting faces 12c contacting with the end faces $B_2$ of the shaft B.

The curved face 12a contacts slidingly with the curved face 11c formed on the inner circumference of the outer ring 11. The center of the curved face 12a places on the axis 3. It is possible to determine or shape the shape of the curved face 12a as a spherical face having its center on the axis 3 or as a curved surface attained by combining or joining spherical faces of different diameters.

The contacting face 12c contacts with the end face $B_2$ formed on the shaft B and a thrust load applied to the shaft B is transferred to the contacting face 12c. In consequence, the contacting face 12c has formed so as to have a right angle face of a high precision relative to the axis 3 of the contacting face 12c. The contacting face 11c protrudes from the end face 11b of the outer ring 11. As a result, when the end face $B_2$ of the shaft B contacts or presses the contacting face 12c of the inner ring 12, the end face $B_2$ of the shaft B doesn't contact with the end face 11b of the outer ring 11. In consequence, the length of the inner ring 12 measured along the direction of the axis 3 or the distance between the contacting faces 12c is larger than the length of the outer ring 11 along the axis 3 or the thickness of the outer ring 11.

It is preferable that the curved face 11c formed on the outer ring 11 corresponds in shape nearly to the shape of the curved face 12a formed on the inner ring 12. In addition, it is too preferable to form a gap suitable in degree to prevent the shaft fitted into the inner ring 12 from generating.

According to the preferable embodiment of the present invention, a ring-like groove 15 extending along the whole periphery of the top portion of the curved face 11c is formed at the top portion. When the outer ring 11 and the inner ring 12 are lapped, abrasive or lubricant is supplied to the curved face 11c through the groove 15. A plurality of through holes 16 led to the ring-like groove 15 are formed on the outer circumferential portion 11a of the outer ring 11. Through these holes 16, abrasive or lubricant is supplied to the groove 15 from outside of the outer ring 11 or abrasive or lubricant is discharged from the groove 15.

In order to construct the bearing C by means of the outer ring 11 and the inner ring 12 thus constructed as described above, halves 13 and 14 are placed so as to face the curved faces 11c formed on the halves 13 and 14 to each other and envelope the inner ring 12, and then the opposing faces of the halves 13 and 14 are melted or adhered to each other fixedly in a manner of rotatable of the inner ring 12 by the outer ring 11.

According to the bearing C thus constructed, it is possible to support the compound load of A thrust load and a radial load, respectively functioning to the shaft B in a manner similar to that of the first embodiment of the present invention.

Next, a manufacturing method for the bearings A and C will be explained.

Concerning the bearing A, abrasive, such as diamond powder and the like is directly supplied to the curved face 1d formed on the outer ring 1 and the curved face 2a formed on the inner ring 2, the outer rings 1 and 11, the inner rings 2 and 12 are relatively rotated, and the curved faces 1d and 2a or curved faces 11a and 12a become accustomed to each other finishing in smooth curved faces.

Concerning the bearing C, abrasive, such as diamond powder and the like is supplied to the curved face 11c and the curved face 12a formed on the inner ring 12 through the hole 16 and the groove 15 formed on the outer ring 11, the outer rings 1 and 11, the inner rings 2 and 12 are relatively rotated, and the curved faces 1d and 2a or curved faces 11a and 12a become accustomed to each other finishing in smooth curved faces. Next, after the operation of abrasion, concerning the bearing A, the contacting faces of the curved faces 1d and 2a are separated and the abrasive remained on respective curved faces 1d and 2a is cleaned by means of fluid, such as water and the like. Concerning the bearing C, fluid is supplied to the curved faces 11c and 12a through the hole 16 and the groove 15 in order to discharge abrasive thereon and clarify the respective curved faces 11c and 12a.

It is possible to the curved faces 1d and 2a or the curved faces 11c and 12a become relatively accustomed to each other and to manufacture the bearings A and C enabling to smoothly rotate after carrying out the manufacturing process above of the bearings A and C.

Concerning the bearing A, it is possible to supply lubricant to the curved faces 1d and 2a and lubricate the sliding faces of the bearing A and C. Concerning the bearing C, it is possible to lubricate the sliding faces of the bearing C by means of supplying lubricant to the curved faces 11c and 12a through the hole 16 and the groove 15.

With relation to the construction above, when lubricant to be supplied to the sliding faces of respective bearings A and C is made circulated, it is possible to cool the heat generated on the sliding faces.

(Other Embodiments)

According to the first and the second embodiments above of the present invention, respective curved faces of the outer rings 1 and 11, the inner rings 2 and 12 are used as sliding faces, however it is possible to change these curved faces to cone-like curved faces as shown in FIG. 5.

That is, on the inner circumference of the outer ring 1, there are formed of cone-like curved face 1e of a concave-shape and a straight lined portion 1f continued to the cone-shape curved face 1e. On the outer circumference of the inner ring 2, there are formed of a convex-like cone-shape curved face 2c corresponding to the cone-shape curved face 1e and a straight line portion 2d being continuous to the cone-shape curved face 2c.

According to the construction above, the compound load applied to the shaft B is borne by a sliding contact between the cone-like curved face 2c formed on the inner ring 2 and a cone-like curved face 1e formed on the outer ring 1. Because these cone-like curved faces 2c and 1e are contacting in a line during the sliding contact, it is possible to lessen a contacting pressure.

Because that the outer rings 1 and 11, and the inner rings 2 and 12 of the bearings A and C carries out their mutual sliding contacts, heat is generated due to the sliding friction in the bearings. Because respective outer rings 1 and 11, and the inner rings 2 and 12 are made of ceramics material, few thermal influence is happened in the bearings A and c. That is, the thermal expansion coefficient of ceramics is bout $3-11 \times 10^{-6}/°C.$, so that no excessive stress due to thermal expansion is generated and no deterioration due to the heat is happened in the bearings A and C.

What is claimed is:

1. A ceramic bearing comprising a ceramic outer ring having a non-spherical curve-shape sliding face formed on the inner circumference of the outer ring and a ceramic inner ring provided with on its outer circumference a sliding face made from a non-spherical curved face corresponding to the sliding face formed on the inner circumference of said ceramic outer ring and a shaft hole through which a shaft is disposed, wherein said shaft hole being coincident with an axis of the sliding face, whereby said shaft is disposed to coincide with the axis of the sliding face.

2. The bearing of claim 1 further comprising a lubricant located between said sliding face formed on the inner circumference of the outer ring and said sliding face formed on the outer circumference of the inner ring.

3. The ceramic-made bearing according to claim 1 or claim 2, wherein the ceramic-made outer ring has a hole through which lubricant is supplied to the sliding faces.

4. The ceramic-made bearing according to one of claims 1 or 2, wherein the shape of the sliding face of the ceramic-made outer ring is a concave curved face or a concave cone-shaped face, and the shape of the sliding face of the ceramic-made inner ring is a convex curved face or a convex cone-shape face.

5. A ceramic bearing comprising a ceramic outer ring having a non-spherical curve-shape sliding face formed on the inner circumference of the outer ring and a ceramic inner ring provided with on its outer circumference a non-spherical sliding face made from a curved face corresponding to the sliding face formed on the inner circumference of said ceramic outer ring and a shaft hole through which a shaft is disposed, wherein said ceramic inner ring being contained in said ceramic outer ring, whereby said shaft is disposed to coincide with an axis of the sliding face.

6. The bearing of claim 5 further comprising a lubricant located between said sliding face formed on the inner circumference of the outer ring and said sliding face formed on the outer circumference of the inner ring.

* * * * *